United States Patent [19]

Chiu

[11] Patent Number: 4,525,397
[45] Date of Patent: * Jun. 25, 1985

[54] LIQUID SMOKE TREATED CELLULOSIC FOOD CASINGS

[75] Inventor: Herman S. Chiu, Chicago, Ill.

[73] Assignee: Union Carbide Corporation, Danbury, Conn.

[*] Notice: The portion of the term of this patent subsequent to Aug. 1, 1995 has been disclaimed.

[21] Appl. No.: 249,494

[22] Filed: Mar. 31, 1981

Related U.S. Application Data

[63] Continuation of Ser. No. 62,358, Jul. 31, 1979, abandoned.

[51] Int. Cl.³ .................. A22C 13/00; A23L 1/232
[52] U.S. Cl. ........................... 428/36; 138/118.1; 426/129; 426/268; 426/315; 426/534; 427/439
[58] Field of Search ............... 138/118.1; 428/36; 426/90, 92, 105, 129, 250, 268, 315, 534, 538, 650; 427/434.2, 439

[56] References Cited

U.S. PATENT DOCUMENTS

| | | | |
|---|---|---|---|
| 2,819,488 | 1/1958 | Gimbel | 17/42 |
| 2,901,358 | 8/1959 | Underwood et al. | 138/118.1 |
| 2,983,949 | 5/1961 | Matecki | 17/42 |
| 2,984,574 | 5/1961 | Matecki | 17/42 |
| 3,097,393 | 7/1963 | Matecki | 17/42 |
| 3,106,473 | 10/1963 | Hollenbeck | 426/650 |
| 3,110,058 | 11/1963 | Marbach | 17/42 |
| 3,158,492 | 11/1964 | Firth | 426/135 |
| 3,316,189 | 4/1967 | Adams | 428/424.2 |
| 3,330,669 | 7/1967 | Hollenbeck | 426/302 |
| 3,360,383 | 12/1967 | Rose et al. | 426/135 |
| 3,378,379 | 4/1968 | Shiner et al. | 138/118.1 |
| 3,383,223 | 5/1968 | Rose | 426/420 |
| 3,451,827 | 6/1969 | Bridgeford | 426/420 |
| 3,467,527 | 9/1969 | Wistreich | 426/650 |
| 3,617,312 | 11/1971 | Rose | 138/118.1 |
| 3,873,741 | 3/1975 | Melcer et al. | 426/314 |
| 3,898,348 | 8/1975 | Chiu et al. | 426/413 |
| 3,905,397 | 9/1975 | Chiu | 138/118.1 |
| 4,104,408 | 8/1978 | Chiu | 426/135 |
| 4,171,381 | 10/1979 | Chiu | 426/105 |
| 4,196,220 | 4/1980 | Chiu et al. | 426/105 |
| 4,278,694 | 7/1981 | Chiu | 426/650 |

FOREIGN PATENT DOCUMENTS

| | | | |
|---|---|---|---|
| 151768 | 9/1950 | Australia | 426/135 |
| 731091 | 3/1966 | Canada | 426/135 |
| 815475 | 6/1969 | Canada | 426/105 |
| 1099326 | 2/1961 | Fed. Rep. of Germany . | |

*Primary Examiner*—John E. Kittle
*Attorney, Agent, or Firm*—John C. LeFever; Real J. Grandmaison

[57] ABSTRACT

A shirred tubular cellulosic food casing suitable for imparting smoke color and flavor to food products processed therein is manufactured by treating the external surface of the casing with liquid smoke before shirring.

21 Claims, 3 Drawing Figures

LIQUID SMOKE TREATED CELLULOSIC FOOD CASINGS

This application is a continuation of my prior application Ser. No. 062,358 filed July 31, 1979 abandoned.

This invention relates to a method for manufacturing a shirred tubular cellulosic food casing suitable for imparting smoke color and flavor to food products processed therein. In particular this invention relates to an improvement in a method for manufacturing a shirred tubular cellulosic food casing encompassing prior to shirring, treating the external surface of the casing with an aqueous liquid smoke composition comprising a mixture of smoke coloring and flavoring constituents.

This invention also relates to a shirred tubular cellulosic food casing having incorporated therein smoke coloring and flavoring constituents.

Tubular cellulosic food casings are used extensively for processing a great variety of meat products and other food items. The food casings are generally thin-walled tubing of various diameters prepared from reconstituted materials, such as regenerated cellulose. Cellulosic food casings may also be prepared with fibrous webs embedded in the wall thereof, such casings commonly being referred to as "fibrous food casings".

The many different recipes and modes of processing that are used by the processed food industry to suit different tastes, and even regional preferences, generally necessitates the use of food casings with a variety of characteristics. In some instances, for example, food casings are required to have multifunctional uses wherein they serve as containers during the processing of a food product encased therein, and then also serve as a protective wrapping for the finished product. In the processed meat industry, however, the food casings used in the preparation of many types of meat products, such as various types of sausages, such as frankfurters, bolognas and the like, beef roll, hams and the like, are frequently removed from about the processed meat product prior to slicing and/or final packaging.

Surface appearance and flavor are important factors in the commercial and consumer acceptance of most processed meat products, and a common feature of most varieties of such products involves the use of "smoking" for imparting characteristic flavor and color thereto. The "smoking" of food products was generally accomplished by the food processors subjecting the food product to actual contact with smoke in a gaseous or cloud-like form. Such "smoking" processes, however, have been considered unsatisfactory for a variety of reasons, including the inefficiencies and lack of uniformity of the "smoking" operation. Because of the shortcomings experienced, the trend has been to employ various types of liquid aqueous solutions of smoke flavors, commonly called "liquid smoke solutions" or "as is" liquid smoke, that have been developed and used commercially by the food processor in the processing of many types of meat and other food products.

The application of "liquid smoke solutions" to meat products is generally carried out in a variety of ways, including spraying or dipping an encased food product during the processing thereof, or by incorporating the "liquid smoke solution" in the recipe itself. The actual operation of "smoking" by spraying or dipping is not completely satisfactory due to inability to treat the encased product uniformly, and incorporation of "liquid smoke solutions" in the meat recipe does not always provide the desired surface appearance because of dilution of smoke ingredients. Incorporation in the recipe also reduces the stability of the meat emulsion, and will adversely affect taste if high concentrations are used. Application of liquid smoke to encased food products by the food processor such as by spraying or dipping, also causes unwanted pollution and equipment corrosion problems for the food processor. In addition, encased sausages treated by application of the liquid smoke during commercial processing have been found to yield after peeling the casing from the treated encased food product, sausages which are lacking in smoke color uniformity from sausage to sausage, and from batch of sausages to batch of sausages. What is even more undesirable, is the lack of uniformity of coloration which often appears on the surface of the same sausage, including light and dark streaks, light and dark blotches, and even uncolored spots which especially appear at the ends of sausages.

It has also been suggested, as for example disclosed in U.S. Pat. No. 3,330,669 to Hollenbeck, that application of a viscous liquid smoke solution to the inside surface of a deshirred tubular food casing by the food processor immediately prior to stuffing the casing with a sausage emulsion, results in preparation of processed food products that exhibit acceptable color and smoky flavor after cooking and removal of the casing. However, the Hollenbeck procedure has not been found practical and is not used commercially. The viscous liquid smoke solution disclosed by Hollenbeck is not practical for coating a casing on a high speed production line, to produce a coated casing which can then be shirred by conventional methods and used as a shirred casing on an automatic stuffing machine. The high viscosity of the Hollenbeck coating solution limits the casing coating speed and, if a conventional method such as "slugging", also called "bubble coating", is used to coat the inside of the casing, the viscous Hollenbeck coating necessitates frequently cutting the casing open to replenish the slug of coating material within the casing which results in short lengths of casing, thus making continuous shirring impractical. In addition, use of a coating such as disclosed by Hollenbeck would result in excessive liquid smoke being applied to the casing, thereby resulting in degradation of the casing. Because commercially sold "as is" liquid smoke is acidic, high levels cause cellulosic casings to degrade and, therefore, a casing coated with Hollenbeck's coating would be weakened so that it could not be processed in conventional stuffing and linking machines. The weakened casing is also more subject to damage during shirring.

Heretofore, however, it has been found that providing casings which afford special treatment or structural characteristics to the food product can be more uniformly and economically accomplished by the casing manufacturer. This is especially true with the advent of and wide commercial use of automatic stuffing and processing equipment in the processed food industry.

Several methods of providing food casings with coatings applied to a surface thereof are known and described in the patent literature. There is disclosed, for example, in U.S. Pat. No. 3,451,827 a spraying method for applying a variety of coating materials over the internal surface of small diameter casings. In U.S. Pat. No. 3,378,379 to Shiner et al, a "slugging" method is used for applying coating materials to the internal surface of large diameter casings. While such techniques and others have been used in preparing commercial quantities of a variety of coated food casings, including casings where liquid smoke is employed as a component in the coating composition, the casings produced thereby have been designed to meet particular commercial requirements and, to the best of our knowledge, none of the prior art coated casings disclosed have been known to successfully impart a satisfactory level of "smoke" flavor and color to a meat product processed therein. For example, in U.S. Pat. No. 3,360,383 to Rose et al, and in U.S. Pat. Nos. 3,383,223 and 3,617,312 to Rose, there are disclosed coating compositions of various protein materials, such as gelatin, that employ liquid smoke solutions in amounts specifically required to insolubilize the protein materials. Such coated casings are disclosed as exhibiting special adhesion properties required for the processing of dry sausages, which properties would therefore limit the suitability thereof for many other casing applications.

Moreover, as is well known, commercially available liquid smoke solutions are highly acidic, generally having a pH of 2.0 to 2.5, though some commercial products are supplied in partially neutralized form with a pH of 4.5 to 5.0, and as disclosed in U.S. Pat. No. 3,467,527 to Wistreich, an oil extract of liquid smoke solution may be provided having a pH in the range between 5.5 and 8.5. The highly acidic nature of aqueous liquid smoke solutions has, heretofore, been essential to maintain all the smoke flavor and/or color constituents in solution, since neutralization to a pH greater than about 5 results in the insolubilization and separation of some of the constitutents thereof.

The problems of using highly acidic materials in conjunction with cellulosic materials have been studied over the years and the detrimental effect thereof on the cellulose polymeric structure, which generally results in a loss of strength, is well known. It has been found that such effects are also prevalent with cellulosic food casings, which adds to the general undesirability of using highly acidic materials with such food casings. It is known, for example, that while manufacturing procedures generally employed in the preparation of food casings involve treatment with highly acidic materials, extensive washing and neutralization treatments are used to assure that the casings are in a substantially neutral condition when packaged for storage or for shipment to a food processor.

It has been found that applying liquid smoke to the internal surface of a casing through a hollow shirring machine mandrel, when applied at a level greater than 5 to 8 mg. of smoke solution per square inch, results in uneven distribution of liquid smoke within the pleats of the casing and causes excess smoke liquid to accumulate at the inside pleat edges. When such casing is stuffed out with food emulsion, the surface of the finished food product has a nonuniform smoke color, which is undesirable.

Internally coating the casing during the manufacture thereof, has been found to be costly and to retard the speed of a continuous high speed production line. Such detriments arise in a method such as "slugging" because replenishment of the "slug" of coating liquid inside the casing has to be performed intermittently by penetrating the wall of the casing to refill the casing with the coating "slug", and there is a continuous change in composition of the slug during the interval between replenishments so that the first portion of casing will have a higher level of treatment than the last portion.

It would be advantageous to provide a method suitable for the high speed manufacture of a tubular food casing, which can be shirred into a shirred casing stick that can be used by the food processor for stuffing, and which is suitable for imparting a uniform and controllable level of smoke color and flavor to food products processed therein without the necessity for the food processor to further smoke the food product.

In accordance with the present invention there is provided a method for manufacturing a shirred tubular cellulosic food casing suitable for imparting smoke color and flavor to food products processed therein which comprises treating the external surface of the casing prior to shirring, with an aqueous liquid smoke composition comprising a mixture of smoke coloring and flavoring constituents, which method is described in detail hereinafter.

In accordance with the present invention there is also provided a shirred tubular cellulosic food casing described in more detail hereinafter.

The method of the invention will become more clear when considered together with the accompanying drawing which is set forth as being merely illustrative of the invention and is not intended to be limitative thereof and wherein.

Figure 1:
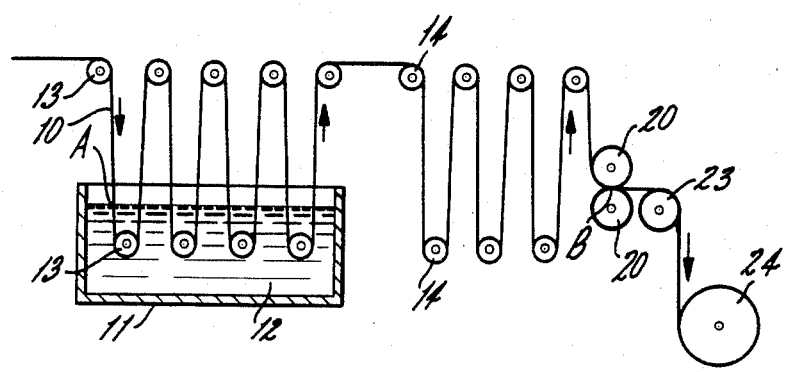
FIG. 1 is a simplified flow diagram illustrating one embodiment of the method of the invention.

Tubular food casings that are suitable for use in the casings of the present invention are tubular casings, and preferably tubular cellulosic casings, that are prepared by any one of the methods well known in the art. Such casings are generally flexible, thin-walled seamless tubing formed of regenerated cellulose, cellulose ethers such as hydroxyethyl cellulose, and the like, in a variety of diameters. Also suitable are tubular cellulosic casings having a fibrous reinforcing web embedded in the wall thereof, which are commonly called "fibrous food casings", as well as cellulosic casings without fibrous reinforcement, herein referred to as "non-fibrous" cellulosic casing.

Smoke coloring and flavoring constituents suitable for use in accordance with the present invention are generally those designated as being the coloring and flavoring constituents of "liquid smoke", which is a well known class of materials also commonly referred to as "liquid smoke solutions" or "as is" liquid smoke. Various aqueous "liquid smokes" are known, all of which are believed suitable for use in the present invention.

The term "solution" as used herein is meant to encompass homogeneous true solutions, emulsions, colloidal suspensions and the like.

Liquid smoke often is a solution of natural wood smoke constituents prepared by burning a wood, for example, hickory or maple, and capturing the natural smoke constituents in a liquid medium such as water. Alternatively, the liquid smoke to be used may be derived from the destructive distillation of a wood, that is, the breakdown or cracking of the wood fibers into various compounds which are distilled out of the wood char residue. Liquid smokes are generally very acidic, usually having a pH of 2.5 or less and a titratable acidity of at least 3% although some partially neutralized liquid smokes, having a pH up to about 5, are also available.

Reference to the term "smoke coloring and flavoring constituents", as used throughout this specification and in the appended claims with respect to the liquid smoke compositions and casings of the invention, is intended to refer to, and should be understood as referring to, the smoke coloring and flavoring constituents derived from liquid smoke solutions in their present commercially available form. The term "smoke flavoring and coloring constituents", as used herein, is intended to be synonymous with the term "smoke solids" which is the term commonly used by the suppliers of commercial liquid smokes.

The liquid smoke that is preferred for use with this invention is a solution of natural wood smoke constituents. This liquid smoke is produced by the limited burning of hardwoods and the absorption of the smoke so generated, into an aqueous solution under controlled conditions. The limited burning keeps some of the undesirable hydrocarbon compounds or tars in an insoluble form, thereby allowing removal of these constituents from the final liquid smoke. Thus, by this procedure, the desirable wood constituents are absorbed into the solution in a balanced proportion and the undesirable constituents may be removed. The resultant liquid smoke solution is representative of the whole preferred spectrum of smoke colors and flavors without a preference for any one type. The apparatus and method for manufacturing typical liquid smokes of the preferred type is more fully described in U.S. Pat. Nos. 3,106,473 to Hollenbeck and 3,873,741 to Melcer et al.

Certain liquid smokes have been approved for use in meat food products by the Meat and Poultry Inspection Division, Food Safety and Quality Service of the U.S. Department of Agriculture. Exemplary of suitable commercially available liquid smokes are CHARSOL from Red Arrow Products Co.; LIQUID HICKORY SMOKE from Hickory Specialties, Inc.; ROYAL SMOKE from Griffith Laboratories, Inc.; and SMOKAROMA LIQUID SMOKE from Meat Industry Suppliers, Inc.

It has been found that the commercially available liquid smoke solutions are generally highly acidic, as discussed previously, and that they may degrade cellulosic casings, and will interfere with peelability of the casings if a peeling aid such as carboxymethyl cellulose is used. To alleviate this problem a "substantially neutralized" liquid smoke may be employed in the practice of this invention in admixture with "as is" liquid smoke or as a substitute therefor.

Degradation of the casing depends on the type of casing, the pH of the liquid smoke composition used and the amount of liquid smoke composition coated on the casing. The amount of liquid smoke employed should be selected by those skilled in the art to be less than that which causes casing degradation but to be sufficient to provide satisfactory levels of smoke color and flavor. "As is" liquid smoke may be employed in the present invention if used in an amount less than that which causes degradation.

As used herein, the term "substantially neutralized" is intended to refer to liquid smoke compositions having a pH greater than about 4, preferably having a pH within the range of about 5 to about 9, and more preferably having a pH within the range of about 5 to about 6.

A substantially neutralized aqueous liquid smoke composition suitable for use in the practice of the present invention is disclosed in U.S. Pat. No. 4,104,408 issued to H.S. Chiu on August 1, 1978 entitled "Substantially Neutralized Aqueous Liquid Smoke Compositions."

In accordance with the invention disclosed in U.S. Pat. No. 4,104,408 there is provided an aqueous liquid smoke composition that is in a generally neutralized condition, having a pH greater than 5, and is suitable to impart smoke color and flavor characteristics to a cellulosic food casing and to food products processed therein comprising a uniform mixture, and preferably an aqueous solution of smoke coloring and flavoring constituents, an alkaline neutralizing agent in an amount sufficient to maintain the solution at a pH greater than 5, and an amount of a short chain alcohol solubilizing agent sufficient to maintain said smoke constituents in solution. The substantially neutralized aqueous liquid smoke solution as disclosed in U.S. Pat. No. 4,104,408 may be applied to the surface of a cellulosic food casing in an amount that will be suitable for imparting smoke flavor and color characteristics to the food casing and to a wide variety of meat products processed therein.

It has now been found that if cellulosic tubular casings are treated before shirring on their external surface with a "substantially neutralized" liquid smoke by the method of the present invention, the presence of a short chain alcohol solubilizing agent is not required in the substantially neutralized liquid smoke composition. To avoid dilution of the liquid smoke, the preferable substantially neutralized aqueous liquid smoke composition used in one embodiment of the present invention is prepared without a short chain alcohol solubilizing agent, by adding to a commercially available liquid smoke an amount of an alkaline neutralizing agent suitable to obtain a pH greater than about 4, preferably a pH within the range of about 5 to about 9, and more preferably a pH within the range of about 5 to about 6.

It has been found that even if a solubilizing agent is used in the present invention, some of the high molecular weight smoke constituents which are kept in solution by the solubilizing agent remain on the outside of the casing and do not diffuse to the internal surface and are not available for contact with an encased meat product. Therefore, a solubilizing agent is optional in the present invention.

Alkaline neutralizing agents suitable for use are any of the well known water soluble alkaline materials such as, for example, potassium hydroxide, sodium hydroxide, ammonium hydroxide, sodium carbonate, sodium bicarbonate, sodium phosphate, disodium hydrogen phosphate, and the like. The alkaline materials may be in solid form or as a concentrated solution thereof. The most highly alkaline materials are most advantageously employed in order that the concentration of smoke constituents will be maintained as high as possible in a substantially neutralized solution thereof.

Liquid smoke, such as in the form of a commercially available aqueous "as is" liquid smoke solution, or a "substantially neutralized" aqueous liquid smoke, or mixtures thereof, is applied to the external surface of a tubular cellulosic casing, such as a non-fibrous or fibrous casing, produced by conventional procedures up to the external treatment step of this invention. The liquid smoke is applied to the external surface of the tubular cellulosic casing by passing the casing through a bath of the liquid smoke composition and letting the liquid smoke soak into the casing prior to doctoring off any excess liquid smoke by passing the casing through squeeze rolls, or wipers, and the like, for an amount of time sufficient for the casing to pick up an adequate amount of smoke coloring and flavoring constituents before a conventional shirring step, so that after it is shirred into what is conventionally known as a shirred casing stick, it may then be stuffed by the food processor to produce an encased food product which is processed therein, with the casing thereby being suitable for imparting smoke color and flavor to the food product processed therein without additional smoke treatment being required by the food processor.

The amount of smoke color and flavor desired to be imparted to the food products depends on the nature of the food products themselves and the particular tastes of various consumers. Generally, the liquid smoke-casing contact time during application of the liquid smoke is at least about 1 second, and preferably at least about 5 seconds. Selection of a suitable contact time by those skilled in the art will depend upon such factors as the type of casing, fibrous or non-fibrous, the thickness of the casing, and the moisture content of the casing.

Casings conventionally known as "dry stock" may be treated by the method of this invention. Such casings generally have a water content within the range of from about 5 to about 14 weight percent water if non-fibrous casing, or within the range of from about 3 to about 8 weight percent water if fibrous casing, based on the total weight of casing and water.

Casings conventionally known as "gel" casing stock are casings which have not been previously dried, and such casings may also be treated by the method of this invention.

The process of passing the casing through a treatment bath, also referred to in the art as a "dip bath" or a "dip tank," may also be referred to in the art as a "dipping" step.

The liquid smoke composition may be externally applied to the casing by methods other than dipping, such as spraying, brushing, roll-coating, and the like. Dipping is the preferred method.

After the casing is externally treated with the liquid smoke, it may then be shirred by conventional methods, or prior to shirring, it may be dried and/or humidified to a water content suitable for shirring and/or further processing. The need for conventional drying and/or humidification after the external liquid smoke treatment depends on the water content of the casing after treatment and the type of casing. If the casing is a non-fibrous casing, a water content within the range of from about 8 weight percent to about 20 weight percent water immediately before shirring is typical, and for fibrous casing a water content within the range of from about 8 weight percent to about 30 weight percent water immediately before shirring is typical, based on the total weight of casing and water.

In FIG. 1, a flattened, tubular, cellulosic sausage casing 10, is externally treated with a liquid smoke composition during its passage over lower and upper guide rolls 13 through dip tank 11 which contains the liquid smoke composition 12. The casing passes over lower and upper guide rolls 14 after exiting the dip tank and then passes between squeeze rolls 20 which minimize any excess carry-over of the liquid smoke composition. The total contact time of the casing 10 with the liquid smoke composition 12 in the dip tank 11 and with excess liquid smoke composition on the casing passing over the guide rolls 14 before the casing passes through the squeeze rolls 20 will determine the amount of smoke coloring and flavoring constituents of the liquid smoke composition that the casing will pick up. The total contact time is measured from point A to point B in FIG. 1. After the casing passes through squeeze rolls 20, it passes over guide roll 23 and is wound up on reel 24. The casing is then sent on to conventional further processing including conventional humidification, as may be required, and conventional shirring.

Figure 2:
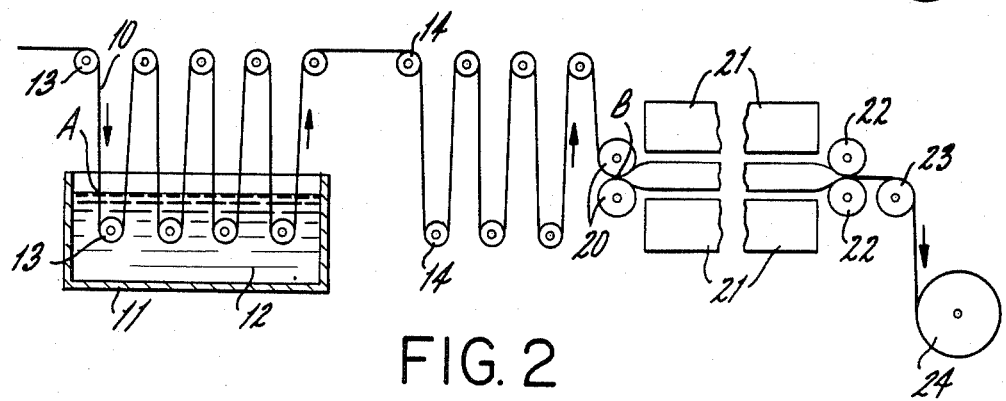
FIG. 2 is a simplified flow diagram illustrating one embodiment of the method of the invention including drying the casing in an inflated condition after external treatment.

The embodiment illustrated in FIG. 2 differs from that illustrated in FIG. 1, in that in FIG. 2 the casing after passing through squeeze rolls 20 is passed into a heating or drying chamber 21, wherein it is dried to the proper moisture content. The casing is inflated by a bubble of air maintained in a relatively fixed position between squeeze rolls 20 and 22 by the sealing action of rolls 20 and 22. The heating chamber 21 can be any type of heating device, such as circulating hot air chambers, which will dry the sausage casing to the proper moisture content. After the casing passes out of the heating chamber 21 and through squeeze rolls 22, it passes over guide roll 23 and is wound up on reel 24. The casing is then sent on to conventional further processing including conventional humidification, as may be required, and conventional shirring.

Figure 3:
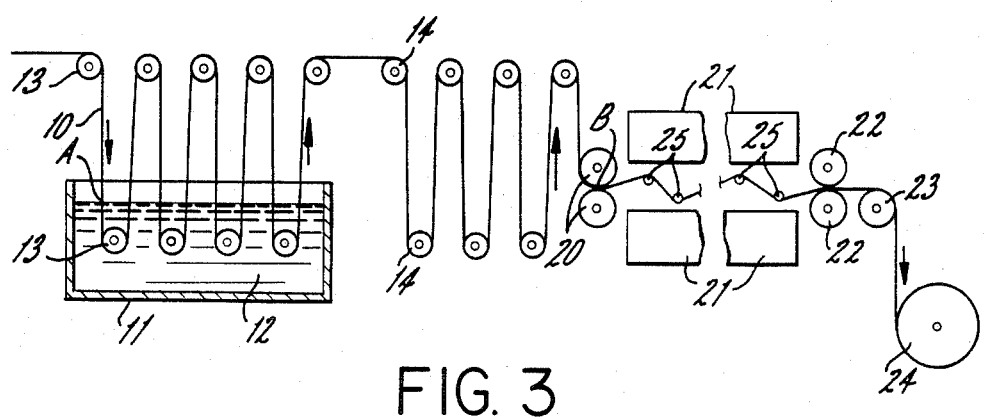
FIG. 3 is a simplified flow diagram illustrating one embodiment of the method of the invention including drying the casing in a flat condition after external treatment.

The embodiment illustrated in FIG. 3 differs from that illustrated in FIG. 2, in that in FIG. 3 the casing is dried in a flat condition while passing over guide rolls 25.

The liquid smoke compositions used in the present invention may also contain other ingredients that may be suitably used in treating a tubular food casing, to which the smoke constituents are applied, e.g., glycerine and/or propylene glycol which may be used as humectants or softening agents, and the like.

Other ingredients which are normally used in the manufacture of, or for further treatment of the food casings, e.g., cellulose ethers, mineral oil, etc., may also be present if desired, and they may be used in the same manner and amounts as if the liquid smoke treatment had not been used.

In particular, agents for improving the peelability of the casings from food products such as sausages, e.g., frankfurters, bolognas and the like, may be optionally coated on the internal surface of the casings before or after the external liquid smoke treatment step, and before or during shirring. Such peelability enhancing agents include, but are not limited to, carboxymethyl cellulose and other water soluble cellulose ethers, the use of which is disclosed in U.S. Pat. No. 3,898,348 issued Aug. 5, 1975 to Chiu et al., the disclosures of which are incorporated herein by reference; "Aquapel" a Hercules, Inc. trademarked product which are alkyl ketene dimers, the use of which is further disclosed in U.S. Pat. No. 3,905,397 issued Sept. 16, 1975 to H. S. Chiu, the disclosures of which are incorporated herein by reference; and "Quilon" an E. I. Dupont de Nemours Co., Inc. trademarked product which are fatty acid chromyl chlorides the use of which is further disclosed in U.S. Pat. No. 2,901,358 issued Aug. 25, 1959 the disclosures of which are incorporated herein by reference.

If a fibrous casing is externally treated with an "as is" liquid smoke, "Aquapel" or "Quilon" is coated on the internal surface thereof to improve peeling properties, before or after the liquid smoke treatment. If the fibrous casing is externally treated with a substantially neutralized liquid smoke, carboxymethyl cellulose or other water soluble cellulose ethers are coated after liquid smoke treatment; but "Aquapel" or "Quilon" may be coated on the internal surface of the casing to improve peeling properties, either before or after liquid smoke treatment. If a non-fibrous casing is externally treated with an "as is" liquid smoke, then the use of carboxymethyl cellulose as a peeling agent is to be generally avoided. However, if the non-fibrous casing is externally treated with a substantially neutralized liquid smoke, then preferably carboxymethyl cellulose or other water soluble cellulose ethers may be coated on the internal surface of the casing to improve peeling properties.

The treatment of casings with carboxymethyl cellulose or other water soluble cellulose ethers is not practical if "as is" liquid smoke is used to treat the casing, because of the high acidity of the "as is" liquid smoke. However, if a carboxymethyl cellulose composition is buffered with a alkaline agent to prevent the carboxymethyl cellulose from being insolubilized, then "as is" liquid smoke can be used. However, methyl cellulose, and other water soluble cellulose ethers which are stable in acid solution, can be used without buffering as a peeling aid to treat a casing that is treated with "as is" liquid smoke.

The peelability enhancing agent may be applied to the internal surface of the tubular food casings by using any one of a number of well known methods. Thus, for example, the peelability enhancing agent can be introduced into the tubular casing in the form of a "slug" of liquid, in a manner similar to that disclosed, for example, in U.S. Pat. No. 3,378,379 to Shiner et al. Advancing the casing past the liquid slug coats the inner surface thereof. Alternatively, the peelability enhancing agent may be applied to the internal surface of the casing through a hollow mandrel over which the casing is advancing as, for example, a shirring machine mandrel in a manner similar to that described in U.S. Pat. No. 3,451,827 to Bridgeford.

The method of this invention is also suitable for producing a printed casing, e.g., a casing having an insignia, trademark, lettering, and the like printed thereon, having smoke coloring and flavoring constituents incorporated therein. Exemplary printed casings are disclosed in U.S. Pat. No. 3,316,189, the disclosures of which are incorporated herein by reference. Food products conventionally smoked in printed casings by the the food processor, after peeling the casing therefrom, may exhibit lighter areas of color on the surface of the food product corresponding to the location of the printed area of the casing, due to the blocking of smoke penetration by the printing. Because the casing of the present invention is printed on its external surface after external liquid smoke treatment, the problem of lighter color areas is eliminated, because the printing no longer blocks the transfer of the smoke to the encased food product.

Casings may be prepared, using the method of this invention, which are suitable for the processing of what is conventionally known in the art as "dry sausages." Unlike other types of non-fibrous and fibrous casings which are preferably easy to peel from the food product either by the food processor before sale to the customer or by the consumer, "dry sausage" casing preferably adheres to the food product during processing. "Kymene," a Hercules, Inc. trademarked product which is a polyamide epichlorohydrin resin, the use of which is further disclosed in U.S. Pat. No. 3,378,379 issued Apr. 16, 1968 to Shiner et al., the disclosures of which are incorporated herein by reference, may be internally coated on the internal surface of a casing treated with liquid smoke by the method of this invention, to improve the adhesion of the casing to food products processed therein.

In accordance with the present invention, there is also provided a shirred tubular cellulosic food casing having incorporated therein smoke coloring and flavoring constituents in an amount of at least about 0.3 mg/in$^2$, and preferably at least about 0.8 mg/in$^2$, of casing surface. The casing may additionally comprise a salt of an alkaline neutralizing agent, if it has been prepared by treatment with a substantially neutralized liquid smoke.

The amount of smoke constituents that will be present in the food casing of the present invention will depend on the desired flavor and/or color characteristics to be imparted to the food products processed therein, and may vary over a wide range. The amount present, therefore, is largely determined by the composition and concentration of smoke constituents in the particular "as is" liquid smoke solution initially employed, which also affects the composition and concentration of the smoke constituents in the substantially neutralized liquid smoke composition if the latter is employed, but, in general, the food casing should have incorporated therein at least about 0.3 mg of smoke coloring and flavoring constituents per square inch of casing surface and preferably at least about 0.8 mg/in$^2$ of smoke constituents. The amount of a salt of an alkaline neutralizing agent, if present, will largely depend on the amount of the alkaline neutralizing agent used to prepare the substantially neutralized liquid smoke coated on the casing.

The shirred tubular cellulosic food casing of the present invention has incorporated therein acids, phenols, and carbonyls derived from the liquid smoke, in the amount of at least about 0.1 mg acids and neutralized acids (expressed as acetic acid) per square inch of casing surface and preferably at least about 0.3 mg acids per square inch of casing surface; at least about 0.003 mg phenols (expressed as 2,6-dimethoxyphenol) per square inch of casing surface and preferably at least about 0.008 mg phenols per square inch of casing surface; and at least about 1.2 mg carbonyls (expressed as 2-butanone) per square inch of casing surface and preferably at least about 1.6 mg carbonyls per square inch of casing surface.

The acids, phenols and carbonyls present in a cellulosic casing are determined by removal using steam distillation from a known area of casing (about 300 inch$^2$). To assure removal, the aqueous bath containing the casing sample is acidified prior to steam distillation. The steam distillate is diluted to a volume of 500 ml prior to analysis. Acids are expressed as acetic acid. Phenols are expressed as 2,6 dimethoxyphenol. Carbonyls are expressed as 2-butanone.

Acids and phenols are determined by the procedures described in the publication S. Simon, et al., *Food Technology*, Vol. 20, No. 11, pp. 114–118 (1966), which procedures are incorporated herein by reference.

Carbonyl compounds present in the steam distillate are determined by reacting a known volume of the distillate with alcoholic 2,4-dinitrophenylhydrazine under acid conditions. The solution is digested at 55° C. for 30 minutes, cooled rapidly, and made basic with alcoholic potassium hydroxide. The solution is shaken and let stand for 30 minutes. The absorbance of the solution is determined at 480 nanometers using a spectrophotometer. The measured absorbance of the solution is compared to the absorbances of a standard curved determined experimentally using 2-butanone. The amount of carbonyl compounds present are then expressed as mg of 2-butanone per inch$^2$ of casing.

The casing of the present invention has an exterior surface which is darker than the interior surface of the casing, which is readily exhibited by darker razer blade scrapings taken from the exterior surface than from the interior surface. When rubbed with dry cloth the casing of this invention does not show any observable color rub-off from either its exterior or interior surfaces.

Food casings of the present invention are generally provided in the form of shirred casing sticks. Such casings may be stored for extended periods of time in smoke impermeable packaging without being structurally degraded or deteriorated by chemical action of the coating, and when employed in the processing of a wide variety of food products, such casings will impart smoke flavor and color to the food products without the need for other well known smoking procedures.

Any one of a number of conventional methods and apparatus known for shirring tubular casing to prepare shirred casing sticks may be employed such as disclosed in, but not limited to, U.S. Pat. Nos. 2,819,488; 2,984,574; 2,983,949; 3,097,393; and 3,110,058.

In practice, tubular casings of lengths ranging from about 40 to 175 feet or more are shirred and compressed to produce what is commonly termed in the art "shirred casing sticks or strands" of from about 8 inches to 27 inches in length.

After shirred casing sticks are prepared, they are packaged and shipped to a food processor, where individual sticks of casing are placed, without prior water soaking, on the stuffing horns and stuffed with food emulsion, thereby filling the casing to its fully extended length and recommended stuffed diameter. The stuffed casings are often linked or clipped or tied, but they may be unlinked. These encased food products are then subjected to processing by conventional methods, which are generally determined by the type of encased food product, without the need for a conventional smoke treatment. Smoke color transfers from the casing to the surface of the encased food product during the processing thereof, and smoke color forms on the surface of the food product during processing due to the reaction of smoke constituents transferred from the casing with proteins in the food product.

The invention will become more clear when considered together with the following examples which are set forth as being merely illustrative of the invention and which are not intended, in any manner, to be limitative thereof. Unless otherwise indicated, all parts and percentages are by weight.

EXAMPLE I

This example illustrates the treatment of a non-fibrous casing by the method of this invention.

A non-fibrous frankfurter size (1.3 inch flat width) cellulosic casing dry stock was passed through a dip tank containing an "as is" liquid smoke solution (ROYAL SMOKE AA from Griffith Laboratories, Inc.). The contact time of the casing with the solution was 45 seconds before doctoring off excess solution by passing the casing through squeeze rolls. About 9.5 mg/in$^2$ of liquid smoke solution was absorbed by the casing corresponding to about 0.9 mg/in$^2$ of smoke coloring and flavoring contituents. Smoke coloring and flavoring constituents which were absorbed by the casing, migrated into the wall of the casing. The casing was then dried at 80° C. to a water content of 12 weight percent. The casing before external treatment may be coated on the internal surface thereof with the agent for improving the adhesion of the casing to food products processed therein or the casing after external treatment and before shirring may be coated on the internal surface thereof with the agent for improving the adhesion of the casing to food products processed therein. The casing was then conventionally moisturized and shirred, stuffed with frankfurter emulsion, and linked. The frankfurters were further processed by steps well-known in the art, but without a conventional smoking step. The casings were then peeled from the finished frankfurters revealing smoke colored frankfurters with a smoke flavor, and a uniform smoke color which did not rub off.

A control sample treated according to the teachings of Hollenbeck in U.S. Pat. No. 3,330,669 on its interior surface with "as is" liquid smoke and a thickening agent (gum guar) produced a casing which was unacceptably structurally degraded as evidenced by severe casing breakage during stuffing. The frankfurters produced from this casing had a smoke color which easily rubbed off.

EXAMPLE II

This example illustrates the treatment of a non-fibrous casing by the method of this invention with a substantially neutralized liquid smoke.

A non-fibrous frankfurter size (1.3 inch flat width) dry stock cellulosic casing was treated and processed as in Example I with the exception that a substantially neutralized liquid smoke having a pH of 5.6 was used instead of the "as is" liquid smoke. The substantially neutralized liquid smoke was prepared by adding 8 gms of anhydrous sodium carbonate to 100 gms of the ROYAL SMOKE AA "as is" liquid smoke of Example I to obtain a pH of 5.6 and filtering to remove precipitated tars. The frankfurters produced had a uniform smoke color which did not rub off, and were smoke flavored after the casing was peeled therefrom.

EXAMPLE III

This example illustrates the treatment of a non-fibrous casing by the method of this invention with a substantially neutralized liquid smoke and a peelability enhancing agent.

A non-fibrous frankfurter size (1.3 inch flat width) dry stock cellulosic casing was treated and processed as in Example II with the exception that a solution containing 0.85 percent carboxymethyl cellulose was spray coated on the interior surface of the casing during shirring at a level of 3.5 mg of the solution per square inch of casing surface, to improve the peeling characteristics of the casing. The frankfurters produced had a uniform smoke color which did not rub off, and were smoke flavored after the casings were peeled therefrom. Casings of Example III peeled with 100% efficiency in a "Ranger Apollo peeler." Casings made in accordance with Example I peeled poorly and had to be peeled by hand following 24 hour cooler storage. Frankfurters made by the teachings of Example III had greater color stability than those of Example I in vacuum packages. During a three week period of cooler storage under artificial light, the frankfurters of Example III showed better color stability than those of Example I.

EXAMPLE IV

This example illustrates the treatment of a fibrous casing by the method of this invention.

A fibrous ham size (6.6 inch flat width) dry stock cellulosic casing was passed through a dip tank containing an "as is" liquid smoke solution (ROYAL SMOKE AA). The contact time of the casing with the solution was 46 seconds before doctoring off excess solution by passing the casing through squeeze rolls. About 13.2 mg/in$^2$ of liquid smoke solution was absorbed by the casing corresponding to about 1.3 mg/in$^2$ of smoke coloring and flavoring constituents. The casing was shirred and stuffed, without presoaking, which chunks of boneless ham and the encased ham was conventionally processed without a conventional smoking step, to produce a chunked and formed boneless ham. The casing peeled satisfactorily from the finished ham revealing a smoke colored ham with a smoke flavor, and a uniform smoke color which did not rub off.

EXAMPLE V

This example illustrates the treatment of a fibrous casing by the method of this invention with a substantially neutralized liquid smoke.

A fibrous ham size (6.6 inch flat width) dry stock cellulosic casing was treated and processed as in Example IV with the exception that a substantially neutralized liquid smoke having a pH of 5.6 was used instead of the "as is" liquid smoke. The substantially neutralized liquid smoke was prepared by adding 8 gms of anhydrous sodium carbonate to 100 gms of the ROYAL SMOKE AA "as is" liquid smoke of Example IV to obtain a pH of 5.6, and filtering to remove precipitated tars. The ham produced had a uniform smoke color which did not rub off, and was smoke flavored after the casing was satisfactorily peeled therefrom.

EXAMPLES VI-VII

These examples illustrate that fibrous casing containing liquid smoke which was suitable for ham chunks did not provide a casing with satisfactory peeling characteristics when stuffed with bologna emulsion.

In Example VI, a fibrous bologna size (6.6 inch flat width) dry stock cellulosic casing was treated and processed as the ham size casing was in Example IV with the exception that instead of stuffing with ham chunks, the casing was stuffed with bologna emulsion which was further processed under conventional bologna processing conditions, but without a conventional smoking step.

In Example VII, another bologna size casing was treated and processed as the ham size casing was in Example V, with the exception that bologna emulsion was used instead of the ham, and the encased bologna was processed under conventional bologna processing conditions, but without a conventional smoking step.

Both bolognas exhibited unacceptable scarring on their surfaces after the casings were peeled therefrom.

EXAMPLE VIII

This example illustrates the treatment of a fibrous casing by the method of this invention with a peelability enhancing agent and also illustrates that such casings may be satisfactorily peeled from bolognas processed therein.

A fibrous bologna size (6.6 inch flat width) dry stock cellulosic casing was slug coated on its interior surface with "Quilon" in accordance with the teachings of U.S. Pat. No. 2,901,358 to improve the peeling characteristics of the casing and then the casing was dried to 6 weight percent water content and then was passed through a dip tank containing an "as is" liquid smoke solution (ROYAL SMOKE AA). The contact time of the casing with the solution was 46 seconds before doctoring off excess solution by passing the casing through squeeze rolls.

About 13.2 mg/in$^2$ of liquid smoke solution was absorbed by the casing corresponding to about 1.3 mg/in$^2$ of smoke coloring and flavoring constituents.

The casing was shirred and then stuffed with bologna emulsion. The casing was not soaked in water prior to the stuffing step, since soaking would have leached some of the smoke components from the casing. The bolognas were further processed by steps well-known in the art, but without a conventional smoking step. The casings were then peeled from the encased product to produce bologna having uniform smoke color which did not rub off, and having smoke flavor. The casings peeled well without scarring the surface of the bolognas.

EXAMPLE IX

This example illustrates the treatment of a fibrous casing by the method of this invention with a substantially neutralized liquid smoke and a peelability enhancing agent and also illustrates that such casings may be satisfactorily peeled from bolognas processed therein.

A fibrous bologna size (6.6 inch flat width) dry stock cellulosic casing was treated and processed as in Example VIII with the exception that a substantially neutralized liquid smoke having a pH of 5.6 was used instead of the "as is" liquid smoke. The substantially neutralized liquid smoke was prepared by adding 8 gms of anhydrous sodium carbonate to 100 gms of the ROYAL SMOKE "as is" liquid smoke of Example VIII to obtain a pH of 5.6, and filtered to remove precipitated tars. The bolognas produced had a uniform smoke color which did not rub off, and were smoke flavored after the casings were peeled therefrom. The casings peeled well without scarring the surface of the bolognas.

EXAMPLE X

This example illustrates the treatment of a fibrous casing by the method of this invention with a peelability enhancing agent and also illustrates that such casings may be satisfactorily peeled from bolognas processed therein.

A fibrous bologna size (6.6 inch flat width) dry stock cellulosic casing was passed through a dip tank containing a substantially neutralized liquid smoke solution having a pH of 5.6, prepared as in Example IX. The contact time of the casing with the solution was 46 seconds before doctoring off excess solution by passing the casing through squeeze rolls.

About 13.2 mg/in$^2$ of liquid smoke solution was absorbed by the casing corresponding to about 1.3 mg/in$^2$ of smoke coloring and flavoring constituents. A solution containing 2 weight percent carboxymethyl cellulose peelability enhancing agent was slug coated on the casing which was then passed through squeeze rolls to remove excess solution. Approximately 6 mg of carboxymethyl cellulose solution was absorbed per square inch of casing surface.

The casing was shirred and the stuffed with bologna emulsion. The casing was not soaked in water prior to the stuffing step, since soaking would have leached some of the smoke components from the casing. The bolognas were further processed by steps well-known in the art, but without a conventional smoking step. The casings were then peeled from the finished product to produce bolognas having uniform smoke color which did not rub off, and having smoke flavor. The casings peeled well without scarring the surface of the bolognas.

EXAMPLES XI-XXVIII

These examples, as tabulated in Table 1, illustrate the color intensity and uniformity of frankfurters conventionally produced by various frankfurter manufacturers using wood smoke and liquid smoke versus the frankfurters produced by using the casing of the present invention.

Commercially manufactured frankfurters (Examples XI-XXIV) were purchased at retail stores. Some of the commercial samples were prepared by wood smoking and others by application of liquid smoke during commercial processing of the frankfurters, as indicated in Table 1.

Example XXVIII indicates the colorimetric value of frankfurters processed in an "as is" liquid smoke externally treated casing of this invention, while Example XXVI indicates the colorimetric value of frankfurters processed in a substantially neutralized liquid smoke externally treated casing of this invention. For comparison, Examples XXV and XXVII indicate the colorimetric values of frankfurters processed in internally treated casings.

Franks were removed from the packages and measured colorimetrically using a Gardner Colorimeter Model XL23. Each frank on the bottom side of the package was measured 3 times for approximately 15 measurements per package. Franks were measured at both ends and the middle. Color analysis of commercial frankfurters indicated a wider range of lightness vs. darkness and redness. Ends of franks which were commercially purchased were lighter than the rest of the surface. Commercial franks also had color streaking and "touch marks". The foregoing color defects which were found in the commercial franks were not found in any of the franks which were produced in the casings of this invention.

Franks processed in casings of the present invention (Examples XXVI and XXVIII) were typically more uniform in coloration as indicated by the standard deviations in the table.

It can also be seen from the table that frankfurters externally coated by the method of this invention (Example XXVIII—"as is" liquid smoke; Example XXVI substantially neutralized liquid smoke) were darker and redder than those internally slug coated (Examples XXV and XXVII). This is due to the fact that during slug coating the slug is quickly depleted and must be replenished, while in comparison a dip tank in itself is a larger reservoir which is able to maintain a more constant concentration of the liquid smoke constituents in contact with the casing by utilizing frequent replenishment of the liquid smoke without shutdown of the casing processing line, as is the situation with the slugging method.

TABLE 1

| Example | | Smoke Type | Meat Type | L Mean | L S.D. | a Mean | a S.D. |
|---|---|---|---|---|---|---|---|
| XI | | Wood | Pork/Beef | 50.25 | 1.25 | 16.15 | 0.84 |
| XII | | Liquid Smoke | Pork/Beef | 55.74 | 1.85 | 14.50 | 0.70 |
| XIII | | Wood | Pork/Beef | 54.30 | 3.66 | 15.68 | 0.90 |
| XIV | | Liquid Smoke | Pork/Beef | 53.73 | 2.05 | — | — |
| XV | | Liquid Smoke | Pork/Beef | 54.53 | 1.91 | 14.78 | 0.82 |
| XVI | | Wood | Pork/Beef | 58.85 | 3.44 | 12.98 | 1.42 |
| XVII | | Wood | Pork/Beef | 48.59 | 4.72 | 15.34 | 2.31 |
| XVIII | | Wood | Beef | 51.68 | 3.56 | 15.70 | 1.53 |
| XIX | | Wood | Pork/Beef | 56.76 | 3.25 | 14.48 | 1.02 |
| XX | | Wood | Beef | 51.82 | 1.93 | 14.58 | 1.31 |
| XXI | | Wood | Pork/Beef | 51.07 | 2.67 | 14.84 | 2.26 |
| XXII | | Wood | Beef | 50.80 | 2.75 | 16.57 | 0.87 |
| XXIII | | Liquid Smoke | Pork/Beef | 51.19 | 2.60 | 15.91 | 0.28 |
| XXIV | | Wood | Beef | 57.50 | 2.08 | | |
| XXV | *Neutralized-Internal | | | 50.62 | 1.23 | 16.66 | 0.64 |
| XXVI | *Neutralized-External | | | 48.60 | 1.42 | 17.66 | 0.80 |
| XXVII | As Is-Internal | | | 49.40 | 0.46 | 16.66 | 0.31 |
| XXVIII | As Is-External | | | 46.45 | 0.70 | 18.49 | 0.28 |
| | **Control (no smoke) | | | 53.30 | 1.44 | 15.06 | 0.83 |

L-value represents lightness and darkness. Higher the number the lighter the value.
a-value represents redness. The higher the number the more red the sample.
S.D. — standard deviation.
*substantially neutralized, pH 5.5
**coated with a carboxymethyl cellulose peelability enhancing agent.

EXAMPLES XXIX-XXXII

These examples as tabulated in Table 2 illustrate typical amounts of acids, phenols, and carbonyls in casings of this invention. Frankfurter size non-fibrous casings were externally treated with Royal Smoke AA "as is" liquid smoke by the method of this invention (Example XXXI) and with the liquid smoke substantially neutralized to a pH of 5.5 (Example XXIX) by the method of this invention. Casings were also prepared by internally slug coating the "as is" and substantially neutralized liquid smoke, respectively, on the casings (Examples XXXII and XXX). From the table it can be seen that in general, except for the phenols of Examples XXXI and XXXII, casings prepared by the external treatment method of the present invention have higher acid, phenol, and carbonyl levels than those prepared by internally coating the casing. It can also be readily seen from the table that the surface of frankfurters processed in the casings of this invention have higher levels of acids, phenols, and carbonyls than those processed in casings treated by internal slug coating.

width of 1.3 inches. The casing was then slug treated with a solution containing 0.85 percent carboxymethyl cellulose. This internal coating provided 3.5 mg of solu-

TABLE 2

| Example | Sample | Treatment | Smoke Components[1] | | | Colorimetric Values[2] | |
|---|---|---|---|---|---|---|---|
| | | | Acid[3] | Phenols[3] | Carbonyls[3] | L | a |
| XXIX | Neutralized* | External casing | 116(112–125) | 2.0(1.9–2.2) | 349(296–414) | | |
| | | Frankfurter surface | 37(38,36) | 0.95(1.0,0.9) | 28.0(23,28) | 48.60(±1.42) | 17.66(±0.80) |
| XXX | Neutralized* | Internal casing | 71(65–84) | 1.5(1.1–1.8) | 202(166–231) | | |
| | | Frankfurter surface | 27(28,26) | | 17.0(17,19) | 50.62(±1.23) | 16.66(±0.64) |
| XXXI | As Is | External casing | 40(35–47) | 1.1(0.9–1.3) | 429(357–507) | | |
| | | Frankfurter surface | 22(23,21) | 1.6(1.9,1.7) | 35.5(37,34) | 46.45(±0.70) | 18.49(±0.28) |
| XXXII | As Is | Internal casing | 25(23–26) | 1.2(1.0–1.3) | 408(371–432) | | |
| | | Frankfurter surface | 20.5(21,20) | 1.0(1,1) | 32.5(35,30) | 49.40(±0.46) | 16.66(±0.31) |
| | Regular | Control | 3.4(2.7–4.0) | 0 | 118(116–121) | — | — |
| | EZ Peel | Control** | 2.0(1.2–2.8) | 0 | 112(103–121) | | |
| | | Frankfurter surface | 15.5(15,16) | 0.03(.01,.05) | 28.5(21,36) | 53.30(±1.44) | 15.06(±0.83) |

[1]Range of 4 sticks/treatment in parentheses. Smoke components isolated from casing by steam distillation of an acidified solution. Smoke components expressed as acetic acid (acids), dimethoxyphenol (phenols), and 2-butanone (carbonyls).
[2]Corresponds to colorimetric values of Table 1.
*Substantially neutralized, pH 5.5
**coated with a carboxymethyl cellulose peelability enhancing agent.
[3]Units for casing are mg/100 sq. in. Units for frankfurter surface are mg/100 gms of frankfurter surface layer.

EXAMPLE XXXIII

This example illustrates the use of a buffered peelability enhancing agent to prepare a casing of this invention.

A non-fibrous frankfurter size dry stock cellulosic casing was treated with "as is" liquid smoke and processed as described in Example I with the exception that a pH 11.4 solution containing 92.4 parts of a solution containing 0.85 percent carboxymethyl cellulose and 7.6 parts of a 26% sodium carbonate in water solution was spray coated on the interior surface of the casing during shirring to improve the peeling characteristics of the casing. The casing peeled easily from the frankfurters to produce frankfurters having a uniform smoke color which did not rub off, and having a smoke flavor.

EXAMPLE XXXIV

A non-fibrous frankfurter size cellulosic casing gel stock was taken from the casing manufacturing process at a point prior to the conventional drying step. This wet casing was passed through a dip tank containing an "as is" liquid smoke solution (ROYAL SMOKE AA). As the gel-stock casing continued to pass through the dip tank, a dark tarry deposit began to coat out on the casing surface from the "as is" smoke solution as the smoke solution migrated into the casing wall. As the run progressed, the tarry deposit began to transfer from the casing surface and accumulate on the carrier rolls and the squeeze rolls of the smoke treatment unit. This tarry deposit was tacky, and eventually the treated casing began to adhere to the rolls, wrap up on the rolls, and break. The run was discontinued.

EXAMPLE XXXV

A new run was begun using the gel-stock identified in Example XXXIV. The gel-stock was passed through a dip tank containing a substantially neutralized liquid smoke having a pH of 5.6. The substantially neutralized liquid smoke was prepared by adding 8 gms of anhydrous sodium carbonate to 100 gms of ROYAL SMOKE AA "as is" liquid smoke, and filtering too remove precipitated tars.

The smoke treated casing was then passed through a dryer in an inflated state under conditions sufficient to produce a non-fibrous frankfurter casing having a flat width of 1.3 inches. The casing was then slug treated with a solution containing 0.85 percent carboxymethyl cellulose. This internal coating provided 3.5 mg of solution per square inch of casing surface in order to improve the peeling characteristics of the casing.

The casing was then hand stuffed in the laboratory with a protein emulsion. The encased product was processed in a laboratory oven and the casing was thereafter peeled off to produce a finished product having a uniform smoke color which did not rub off. No taste test was made.

EXAMPLE XXXVI

A non-fibrous frankfurter size (1.3 inch flat width) dry stock cellulosic casing was treated and processed with a substantially neutralized liquid smoke having a pH of 5.6. The substantially neutralized liquid smoke was prepared by adding 8 gms of anhydrous sodium carbonate to 100 gms of CHARSOL C-10 purchased from Red Arrow Products Company, and filtering to remove precipitated tars. The casing was then treated with a solution of carboxymethyl cellulose as in Example III in order to improve the peeling characteristics of the casing. The frankfurters produced therein had a uniform smoke color which did not rub off, and were smoke flavored after the casings were peeled therefrom.

Although the present invention has been described and set forth in some detail, it should be further understood that the same is susceptible of changes, modifications and variations without departing from the scope and spirit of the invention.

What is claimed is:

1. A shirred tubular cellulosic food casing having incorporated in the external surface thereof a substantially tar-free admixture of smoke coloring and flavoring constituents derived from natural wood and including acids and neutralized acids, phenols and carbonyls in an amount of at least about 0.8 mg. per square inch of casing surface, such that the casing external surface is darker then the casing interior surface, said casing being suitable without other smoking procedures for imparting smoke color and flavor to food products processed therein with said smoke color resulting from reactions of said coloring constituents with proteins in the food products.

2. The casing of claim 1 wherein said casing has incorporated therein at least about 0.1 mg. of acids and neutralized acids expressed as acetic acid, per square inch of casing surface.

3. The casing of claim 1 wherein said casing has incorporated therein at least about 0.003 mg. of phenols expressed as 2,6-dimethoxyphenol, per square inch of casing surface.

4. The casing of claim 1 wherein said casing has incorporated therein at least about 1.2 mg. of carbonyls expressed as 2-butanone, per square inch of casing surface.

5. The casing of claim 1 wherein said casing has incorporated therein at least about 0.3 mg. acids and neutralized acids expressed as acetic acid, per square inch of casing surface.

6. The casing of claim 1 wherein said casing has incorporated therein at least about 0.008 mg. phenols expressed as 2,6-dimethoxyphenol, per square inch of casing surface.

7. The casing of claim 1 wherein said casing has incorporated therein at least about 1.6 mg. carbonyls expressed as 2-butanone, per square inch of casing surface.

8. The casing of claim 1 wherein said casing has at least a smear resistant inner surface when rubbed with a dry cloth.

9. The casing of claim 1 wherein said casing has incorporated therein a salt of an alkaline neutralizing agent and an acid.

10. The casing of claim 1 wherein said casing is a nonfibrous casing.

11. The casing of claim 1 wherein said casing is a fibrous casing.

12. The casing of claim 1 wherein said casing has coated on its interior surface an agent for improving the peelability of the casing from food products processed therein.

13. The casing of claim 12 wherein said peeling agent comprises a water soluble cellulose ether composition.

14. The casing of claim 13 wherein said water soluble cellulose ehter composition comprises a carboxymethyl cellulose composition.

15. The casing of claim 14 wherein said carboxymethyl cellulose composition contains an alkaline buffering agent.

16. The casing of claim 1 wherein said casing has coated on its interior surface an agent for improving the adhesion of the casing to food products processed therein.

17. A shirred tubular cellulosic food casing prepared by the steps of: providing a cellulosic casing selected from the group consisting of a non-fibrous gel stock casing and a fibrous gel stock casing; treating the external surface of said casing with a substantially tar-free aqueous liquid smoke composition having a pH greater than about 4 comprising a mixture of smoke coloring and flavoring constituents derived as said mixture from natural wood, until said casing has incorporated therein said mixture of smoke coloring and flavoring constituents including acids and neutralized acids, pheonls and carbonyls, in an amount of at least about 0.8 mg. per square inch of casing surface, such that the so-treated casing has an exterior surface which is darker than the interior surface of the casing; and thereafter drying and shirring the so-treated casing with the smoke coloring and flavoring constituents incorporated therein being suitable without other smoking procedures for imparting smoke color and flavor to food products processed therein and with said smoke color resulting from reaction of said coloring constituents with proteins in the food products.

18. The casing of claim 1 wherein the substantially tar-free liquid smoke is prepared by removing tar from natural wood-derived tar-containing liquid smoke.

19. The casing of claim 1 wherein the substantially tar-free liquid smoke is prepared by neutralizing natural wood-derived tar-containing liquid smoke and filtering to remove the precipitated tar.

20. The casing of claim 17 wherein the substantially tar-free liquid smoke is prepared by providing natural wood-derived tar-containing liquid smoke and removing the tar therefrom.

21. The casing of claim 17 wherein the substantially tar-free liquid smoke is prepared by providing natural wood-derived tar-containing liquid smoke, neutralizing said tar-containing liquid smoke thereby precipitating tar, and removing the precipitated tar.

* * * * *